(12) United States Patent
Kuranoshita (10) Patent No.: US 9,367,525 B2
(45) Date of Patent: Jun. 14, 2016

(54) DATA PROCESSING APPARATUS FOR PAGE ORDERING, DATA PROCESSING METHOD, AND NONTRANSITORY STORAGE MEDIUM FOR SAME

(71) Applicant: FUJIFILM CORPORATION, Minato-ku, Tokyo (JP)

(72) Inventor: Masashi Kuranoshita, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/606,095

(22) Filed: Jan. 27, 2015

(65) Prior Publication Data

US 2015/0212777 A1 Jul. 30, 2015

(30) Foreign Application Priority Data

Jan. 28, 2014 (JP) ................. 2014-013114

(51) Int. Cl.
*G06K 15/00* (2006.01)
*G06F 17/21* (2006.01)
*G06F 3/12* (2006.01)

(52) U.S. Cl.
CPC ............ *G06F 17/214* (2013.01); *G06F 17/217* (2013.01)

(58) Field of Classification Search
CPC ...... G06F 3/1263; G06F 3/121; G06F 3/1247
USPC ..................... 358/1.13, 1.14, 1.15, 1.17, 1.18
See application file for complete search history.

(56) References Cited

U.S. PATENT DOCUMENTS

| 7,797,622 | B2 | 9/2010 | Déjean et al. | |
| 2008/0079973 | A1* | 4/2008 | Beus et al. | 358/1.13 |
| 2008/0298635 | A1* | 12/2008 | West | 382/101 |
| 2010/0082937 | A1 | 4/2010 | Sasaki | |
| 2011/0077759 | A1* | 3/2011 | Yamasaki | 700/97 |
| 2012/0194841 | A1* | 8/2012 | Ito et al. | 358/1.13 |

FOREIGN PATENT DOCUMENTS

| JP | 2003-296311 A | 10/2003 |
| JP | 2004-274279 A | 9/2004 |
| JP | 2008123528 A | 5/2008 |
| JP | 2010-86151 A | 4/2010 |
| JP | 2011-138378 A | 7/2011 |

OTHER PUBLICATIONS

Rejection of the Application, dated Dec. 1, 2015, issued in corresponding JP Application No. 2014-013114, 8 pages in English and Japanese.

* cited by examiner

Primary Examiner — Gabriel Garcia
(74) Attorney, Agent, or Firm — Sughrue Mion, PLLC (57) ABSTRACT

A data processing apparatus extracts operators (including particular operators) describing character strings in a text format, at least one by one, from among acquired page data. The data processing apparatus determines an order in which two or more of the page data containing the particular operators whose font information coincides with each other are to be arranged according to a sequence indicated by particular characters.

11 Claims, 10 Drawing Sheets

| PAGE DATA INFORMATION | | FONT INFORMATION | | POSITION (x, y) | TEXT CONTENTS |
|---|---|---|---|---|---|
| FILE NAME | PAGE NUMBER | FONT NAME | FONT SIZE | | |
| Train.pdf | 1 | Font A | 20 | 10,10 | 2 |
| | | Font B | 40 | 30,260 | Train |
| Bus.pdf | 1 | Font A | 20 | 10,10 | 4 |
| | | Font B | 40 | 30,260 | Bus |
| Giraffe.pdf | 1 | Font A | 20 | 200,10 | 7 |
| | | Font C | 40 | 30,260 | Giraffe |
| Car.pdf | 1 | Font A | 20 | 200,10 | 1 |
| | | Font B | 40 | 30,260 | Car |
| Dog.pdf | 1 | Font A | 20 | 10,10 | 6 |
| | | Font C | 40 | 30,260 | Dog |
| Ostrich.pdf | 1 | Font A | 20 | 10,10 | 8 |
| | | Font C | 40 | 30,260 | Ostrich |

FIG. 8

| PAGE NUMBER | TEXT CONTENTS | | | | |
|---|---|---|---|---|---|
| | 1ST EXAMPLE | 2ND EXAMPLE | 3RD EXAMPLE | 4TH EXAMPLE | 5TH EXAMPLE |
| 1 | -1- | (1) | 1/8 | 1-1 | i |
| 2 | -2- | (2) | 2/8 | 1-2 | ii |
| 3 | -3- | (3) | 3/8 | 1-3 | iii |
| 4 | -4- | (4) | 4/8 | 1-4 | iv |
| 5 | -5- | (5) | 5/8 | 1-5 | v |
| 6 | -6- | (6) | 6/8 | 1-6 | vi |
| 7 | -7- | (7) | 7/8 | 1-7 | vii |
| 8 | -8- | (8) | 8/8 | 1-8 | viii |

FIG. 9

| PAGE NUMBER | TEXT CONTENTS | PAGE DATA INFORMATION ||
| --- | --- | --- | --- |
| | | FILE NAME | PAGE NUMBER |
| 1 | 1 | Car.pdf | 1 |
| 2 | 2 | Train.pdf | 1 |
| 3 | 3 | NONE | NONE |
| 4 | 4 | Bus.pdf | 1 |
| 5 | 5 | NONE | NONE |
| 6 | 6 | Dog.pdf | 1 |
| 7 | 7 | Giraffe.pdf | 1 |
| 8 | 8 | Ostrich.pdf | 1 |

FIG. 10

DATA PROCESSING APPARATUS FOR PAGE ORDERING, DATA PROCESSING METHOD, AND NONTRANSITORY STORAGE MEDIUM FOR SAME

CROSS-REFERENCE TO RELATED APPLICATION

This application is based upon and claims the benefit of priority from Japanese Patent Application No. 2014-013114 filed on Jan. 28, 2014, the contents of which are incorporated herein by reference.

BACKGROUND OF THE INVENTION

1. Field of the Invention

The present invention relates to a data processing apparatus and a data processing method for carrying out a desired data processing process on a plurality of page data expressed in a page description language, and a nontransitory storage medium storing therein a data processing program for enabling a computer to function as a means for performing a data processing process.

2. Description of the Related Art

Recently, in the printing and platemaking fields, printing workflows have been digitized in their entirety thanks to the widespread use of desktop publishing (DTP) and computer-to-plate (CTP) technologies. For example, there have been a growing number of cases wherein a plurality of designers create page-by-page contents using respective information processing terminals of their own and then submit the created contents as electronic data to a printing company. It will be convenient for the operator of the printing company if a function to automatically arrange the successively submitted electronic data according to the order of page numbers is available to the operator.

Japanese Laid-Open Patent Publication No. 2010-086151, for example, discloses an apparatus for identifying page numbers by checking numbers in particular areas of the page extent indicated in scanned images (image data in a raster format) according to a so-called template matching process.

SUMMARY OF THE INVENTION

Recently, in particular, there have been developed various fonts (typeface styles) that are highly decorative or distinguishable. In addition, the number of languages included in contents has been increasing with the globalization of markets.

The apparatus disclosed in Japanese Laid-Open Patent Publication No. 2010-086151 has been problematic in that not only the total number of templates to be readied for use is huge, but also the greater the number of candidates becomes, the lower the accuracy with which to detect page numbers becomes. Particularly, an excessively decorative font or a small font is more likely to give false positives.

The present invention has been made in view of the above problems. It is an object of the present invention to provide a data processing apparatus, a data processing method, and a nontransitory storage medium storing a program for carrying out a page arranging process with a very high accuracy even if the number of types of fonts that are to be used for page numbers is huge.

According to the present invention, there is provided a data processing apparatus comprising a page acquirer for acquiring a plurality of page data expressed in a page description language, an operator extractor for extracting operators describing character strings in a text format, at least one by one, from among the page data acquired by the page acquirer, an operator classifier for analyzing the operators extracted by the operator extractor and classifying those operators which contain particular characters indicating a sequence in the character strings and whose font information about the character strings coincide with each other, as particular operators, and a page order determiner for determining an order in which two or more of the page data containing the particular operators classified by the operator classifier are to be arranged according to the sequence indicated by the particular characters.

As described above, the data processing apparatus includes the operator extractor for extracting operators (including particular operators) describing character strings in a text format, at least one by one, from among the page data, and the page order determiner for determining an order in which two or more of the page data containing the particular operators whose font information coincides with each other are to be arranged according to the sequence indicated by the particular characters. Since the data processing apparatus is configured as described above, it is possible to easily and reliably judge a commonality in the typeface of page numbers using the font information itself, thereby increasing the accuracy with which to detect whether there are page numbers or not and the contents of the page numbers. As a result, it is possible to carry out a page arranging process highly successfully even if the number of types of fonts that can be used for page numbers is huge.

The operator classifier should preferably further classify those operators describing the character strings whose positional information coincides with or corresponds to each other.

The operator classifier should preferably further classify those operators describing the character strings whose positions are identified by the positional information belong to margins of pages represented by the page data.

The operator classifier should preferably classify those operators whose font names and font sizes identified by the font information coincide with each other.

The data processing apparatus should preferably further comprise an image generator for generating a page arrangement image representing the order determined by the page order determiner.

The page acquirer should preferably acquire the plurality of page data from at least two data files.

According to the present invention, there is also provided a data processing method for enabling a computer to execute the steps of: acquiring a plurality of page data expressed in a page description language, extracting operators describing character strings in a text format, at least one by one, from among the acquired page data, analyzing the extracted operators and classifying those operators which contain particular characters indicating a sequence in the character strings and whose font information about the character strings coincide with each other, as particular operators, and determining an order in which two or more of the page data containing the classified particular operators are to be arranged according to the sequence indicated by the particular characters.

According to the present invention, there is further provided a nontransitory storage medium storing therein a data processing program for enabling a computer to execute the steps of: acquiring a plurality of page data expressed in a page description language, extracting operators describing character strings in a text format, at least one by one, from among the acquired page data, analyzing the extracted operators and classifying those operators which contain particular characters indicating a sequence in the character strings and whose font information about the character strings coincide with each other, as particular operators, and determining an order in which two or more of the page data containing the classified particular operators are to be arranged according to the sequence indicated by the particular characters.

According to the present invention, as described above, operators (including particular operators) describing character strings in a text format are extracted, at least one by one, from among the acquired page data, and an order in which two or more of the page data containing the particular operators whose font information coincides with each other are to be arranged according to the sequence indicated by the particular characters is determined. Therefore, it is possible to easily and reliably judge a commonality in the typeface of page numbers using the font information itself, thereby increasing the accuracy with which to detect whether there are page numbers or not and the contents of the page numbers. As a result, it is possible to carry out a page arranging process highly successfully even if the number of types of fonts that are to be used for page numbers is huge.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A data processing method according to a preferred embodiment of the present invention in relation to a data processing apparatus for carrying out the data processing method and a nontransitory storage medium storing a data processing program will be described in detail below with reference to the accompanying drawings.

[Overall Configuration of Print Production System 10]

Figure 1:
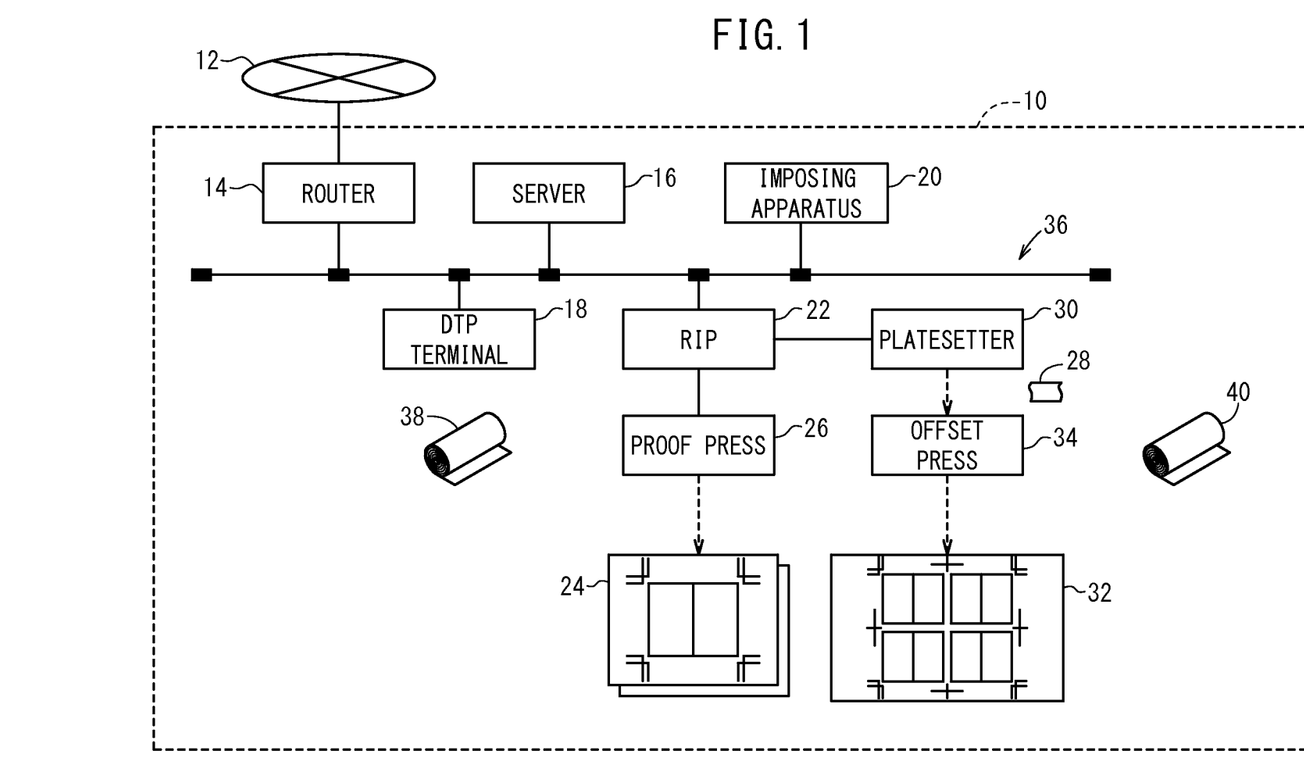
FIG. 1 is a block diagram showing the overall configuration of a print production system incorporating an imposing apparatus as a data processing apparatus according to an embodiment of the present invention.

FIG. 1 shows in block form the overall configuration of a print production system 10 incorporating an imposing apparatus 20 as a data processing apparatus according to an embodiment of the present invention.

As shown in FIG. 1, the print production system 10 includes a router 14 serving as a device for connection to a network 12, a server 16 which is accessible through the network 12 from terminal devices, not shown, belonging to external networks, a desktop publishing (DTP) terminal 18 for performing DTP processes including a process of editing data acquired from the server 16, etc., an imposing apparatus 20 (data processing apparatus) for imposing contents data processed by the DTP terminal 18, a raster image processor (RIP) 22 for performing various image processing processes including a rasterizing process, a color conversion process, etc. on output data imposed by the imposing apparatus 20, a proof press 26 capable of printing a proof 24 based on proofread data sent from the RIP 22, a platesetter 30 for producing printing plates 28 based on platemaking data sent from the RIP 22, and an offset press 34 capable of producing a print 32 with the printing plate 28 set therein.

The server 16 is an apparatus that plays a central role in the workflow management in the print production system 10. The server 16 is connected to various terminal devices of designers and/or production companies, not shown, for communication therewith through the router 14 and the network 12. The server 16 is also connected to the DTP terminal 18, the imposing apparatus 20, and the RIP 22 for communication therewith through a LAN (Local Area Network) 36 constructed in the print production system 10.

Specifically, the server 16 is capable of performing a function as a file server for storing and transferring various data files, a function as an authorization management server for managing task authorizations that are available for terminal devices, users, or print jobs, and a function as a mail server for generating and distributing notification mails at certain times such as process starting and ending times.

The data files that can be managed by the server 16 as the file server include contents data, printing data (e.g., platemaking data, printing plate data, or proofreading data), job ticket files {e.g., job definition format (JDF) files}, international color consortium (ICC) profiles, color sample data files, etc.

The DTP terminal 18 generates page-by-page image data (hereinafter also referred to as "page image") from contents data representing characters, figures, patterns, pictures, etc. which have been processed by a preflight process. The imposing apparatus 20 performs an imposing process according to a binding process and a page folding process which have been designated, by referring to the tag information of a job ticket.

The RIP 22 functions as a printing processing server for at least one type of printing press. In FIG. 1, the RIP 22 is connected to the proof press 26 and the platesetter 30 for communication therewith. The RIP 22 converts data expressed in a page description language (PDL) (hereinafter also referred to as "page data Dp") into output data suitable for each output device, and supplies the output data to the proof press 26 or the platesetter 30.

The proof press 26 prints a proof 24 having images formed on a proof sheet 38 (print medium) on the basis of the proofreading data supplied from the RIP 22. The proof press 26 may comprise a direct digital color proofer (DDCP), an ink jet color proofer, a low-resolution color laser printer (electrophotographic printer), an ink jet printer, or the like.

The offset press 34 produces a print 32 which has images printed on a print sheet 40 (print medium) by applying inks to one or both surfaces of the print sheet 40 through printing plates 28 and intermediate transfer members, not shown. The offset press 34 may be replaced with a digital printing press for direct printing. The digital printing press may comprise an ink jet printing press, a wide-format printing press, an ink jet color proofer, a color laser printer, or the like.

[Electric Arrangement of the Imposing Apparatus 20]

Figure 2:
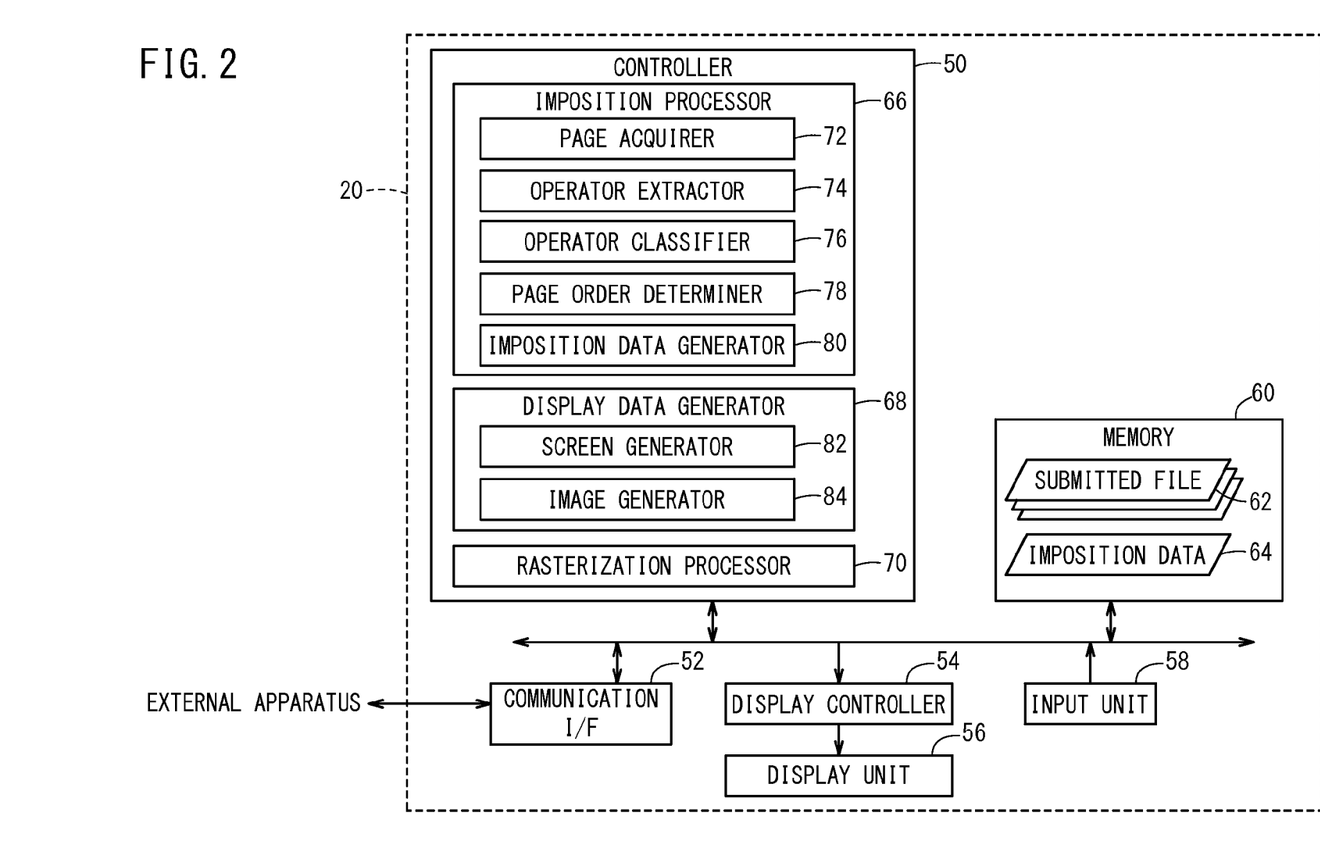
FIG. 2 is an electric block diagram of the imposing apparatus shown in FIG. 1.

FIG. 2 illustrates the imposing apparatus 20 shown in FIG. 1 in electric block form. As shown in FIG. 2, the imposing apparatus 20 comprises a computer having a controller 50, a communication I/F 52, a display controller 54, a display unit 56, an input unit 58, and a memory 60 (storage medium).

The communication I/F 52 is an interface (I/F) for sending electric signals to and receiving electric signals from external apparatus. The imposing apparatus 20 can acquire various data (e.g., submitted files 62) from the server 16 (FIG. 1) through the communication I/F 52, and can supply various data (e.g., imposition data 64) to the server 16 through the communication I/F 52.

The display controller 54 comprises a control circuit for controlling the display unit 56 under the control of the controller 50. Specifically, when the display controller 54 outputs a display control signal via an I/F, not shown, to the display unit 56, the display unit 56 is energized to display various images including windows W (see FIGS. 4, 10).

The memory 60 stores programs and data which are required for the controller 50 to control various components. In FIG. 2, the memory 60 stores the submitted files 62 in a PDF format and the imposition data 64 in a JDF format.

The memory 60 may comprise a nontransitory, computer-readable storage medium. The computer-readable storage medium comprises a portable medium such as a magnetooptic disk, a ROM, a CD-ROM, a flash memory, or the like, or a storage medium such as a hard disk or the like incorporated in a computer system. The storage medium may also include a medium for dynamically holding programs for a short period of time, or a medium for holding programs for a certain period of time.

The controller 50 comprises a processor such as a CPU (Central Processing Unit). The controller 50 reads and executes programs stored in the memory 60 to perform the functions of an imposition processor 66, a display data generator 68, and a rasterization processor 70.

The imposition processor 66 generates imposition data 64 including an order in which a plurality of page data Dp (FIG. 5) are to be arranged, by analyzing a submitted file 62 acquired in advance. Specifically, the imposition processor 66 includes a page acquirer 72 for acquiring a plurality of page data Dp, an operator extractor 74 for extracting a text description operator (or simply an operator) to be described later, an operator classifier 76 for classifying text description operators, a page order determiner 78 for determining an order in which page data Dp are to be arranged, and an imposition data generator 80 for generating imposition data 64.

Figure 4:
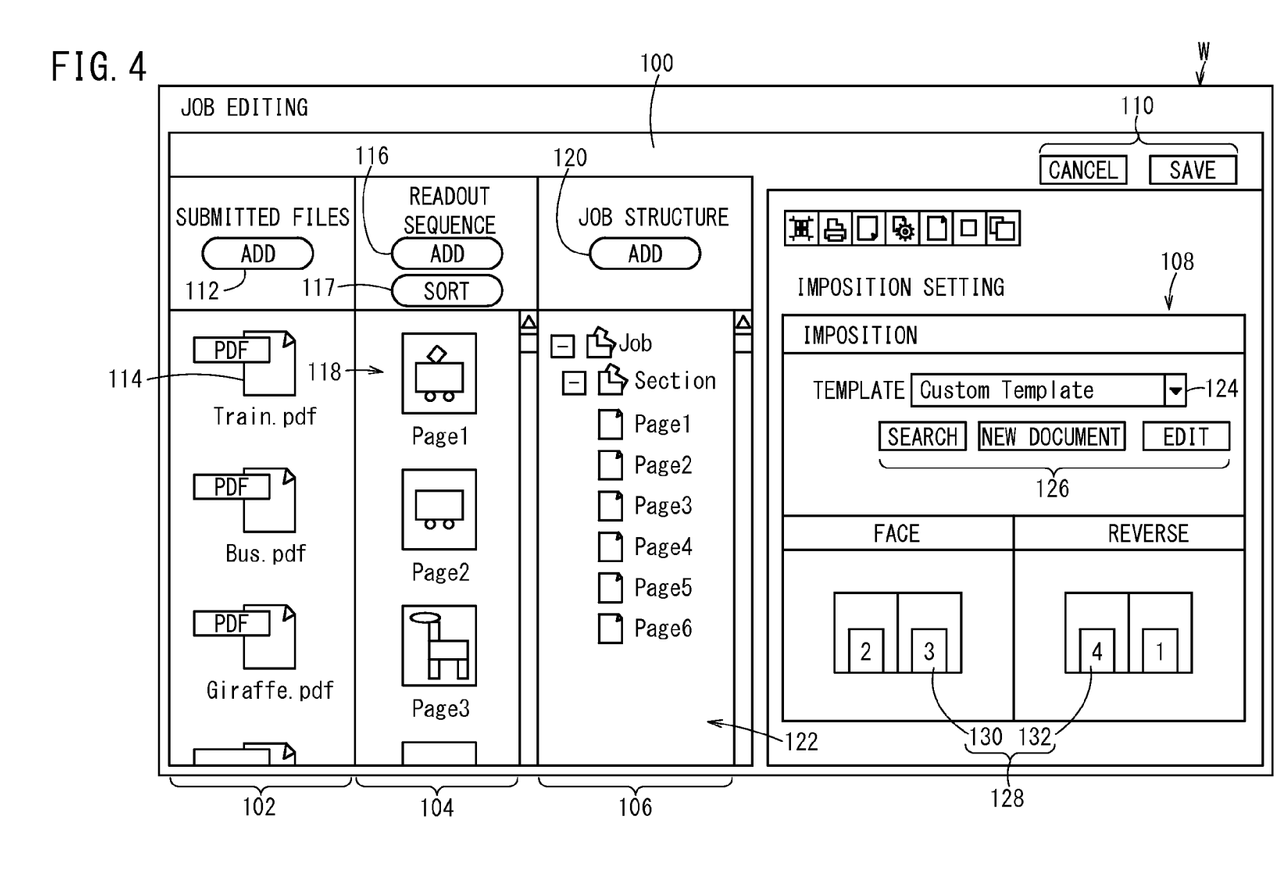
FIG. 4 is a first image diagram showing a job editing screen.

The display data generator 68 includes a screen generator 82 for generating display data for an editing screen 100 (FIG. 4, etc.), and an image generator 84 for generating display data for a page arrangement image 118 (FIG. 4, etc.). The display data may comprise image data generated by application software or various parameters for using an application programming interface (API) function provide by basic software.

The rasterization processor 70 performs a rasterization process on imposed page data. The rasterization process includes a data format converting process for converting page data from a PDL format to a raster format, and a color matching process using ICC profiles.

The input unit 58 comprises various input devices including a mouse, a trackball, a keyboard, a touch sensor, etc. The display function of the display unit 56 and the input function of the input unit 58 are combined into a graphical user interface (GUI).

[Operation of Imposing Apparatus 20]

The imposing apparatus 20 according to the present embodiment is basically configured as described above. Operation of the imposing apparatus 20 shown in FIGS. 1 and 2 will be described in detail below mainly with reference to a flowchart shown in FIG. 3.

Prior to the operation of the imposing apparatus 20, one or more designers belonging to a production company or the like creates contents of a print 32 and electronically sends the created contents as data files to the print production system 10. The server 16 receives submitted files 62 through the network 12, the router 14, and the LAN 36, and stores the submitted files 62 in a database. At this time, the DTP terminal 18 may perform a desired DTP process on the contents data to edit a plurality of submitted files 62 on a page-by-page basis in response to an action of the operator.

The server 16 is arranged so as to be capable of sending the submitted files 62 which have been saved therein to a demanding party including the imposing apparatus 20. When the server 16 sends the submitted files 62 to the imposing apparatus 20, the imposing apparatus 20 receives the submitted files 62 through the LAN 36 and the communication I/F 52, and thereafter temporarily stores the submitted files 62 in the memory 60.

Figure 3:
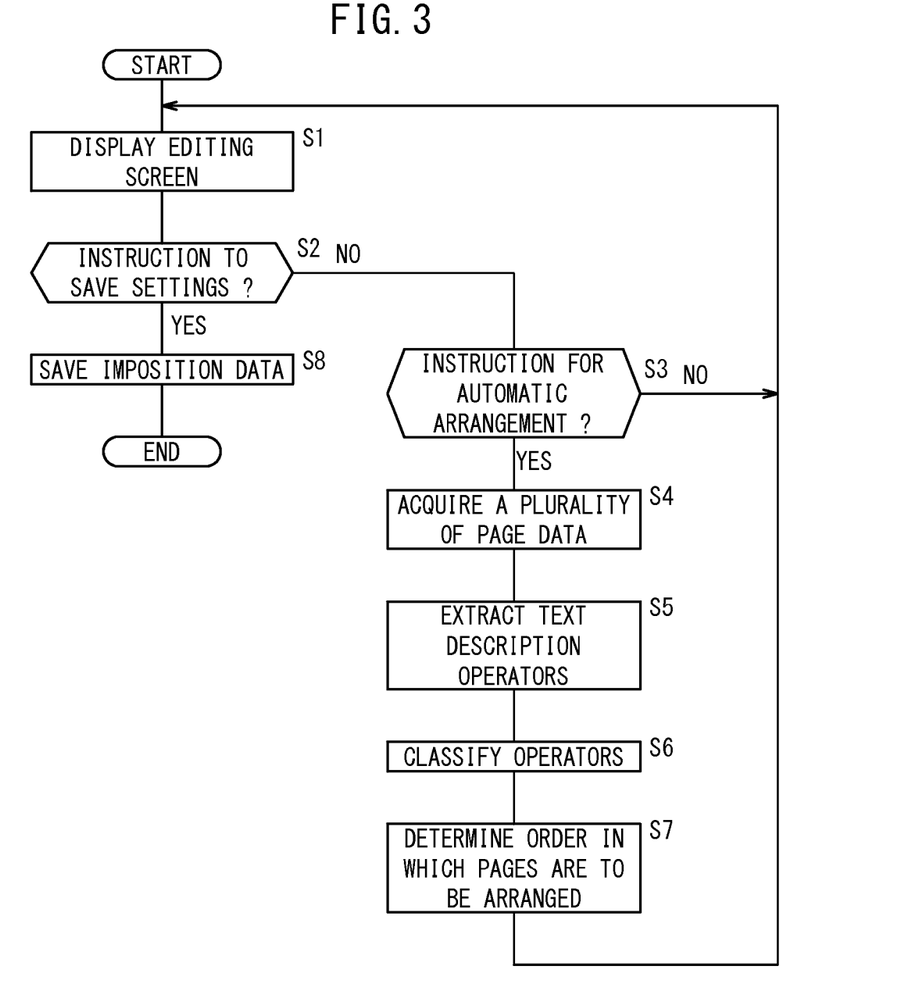
FIG. 3 is a flowchart of an operation sequence of the imposing apparatus shown in FIGS. 1 and 2.

In step S1 shown in FIG. 3, the imposing apparatus 20 displays an editing screen 100 for use in editing a print job. In response to an instruction to start an editing process, the screen generator 82 generates display data for the editing screen 100, and supplies the generated display data to the display controller 54. Based on the display data, the display controller 54 controls the display unit 56 to display a window W (including the editing screen 100).

As shown in FIG. 4, the editing screen 100 includes a first setting field 102, a second setting field 104, a third setting field 106, a fourth setting field 108, and a button group 110 of two buttons marked "CANCEL", "SAVE", respectively. The operator as the user can enter various settings through the setting fields by operating the input unit 58 (see FIG. 2).

A button 112 marked "ADD" is disposed in an upper portion of the first setting field 102. When the "ADD" button 112 is clicked on, it triggers the addition of a data file to be imposed. In the example shown in FIG. 4, the first setting field 102 displays three icons 114 to which respective file names "Train.pdf", "Bus.pdf", "Giraffe.pdf" are given in order from top to bottom. In view of the display icons 114, it is assumed that the submitted files 62 (FIG. 2) have been selected and added according to the sequence of the icons 114.

Two buttons 116, 117 marked "ADD", "SORT" respectively are disposed in an upper portion of the second setting field 104. When the "ADD" button 116 is clicked on, it triggers the addition of a page to be read. In the illustrated example, the second setting field 104 displays part of the page arrangement image 118 made up of a plurality of thumbnails, or more specifically, the thumbnails (wholly or partly) of first through four pages.

A button 120 marked "ADD" is disposed in an upper portion of the third setting field 106. When the "ADD" button 120 is clicked on, it triggers the addition of a section of a job structure. The third setting field 106 displays a hierarchical menu 122 which shows all pages (six pages in the illustrated example) at one hierarchical layer level.

The fourth setting field 108 includes a pull-down menu 124, a button group 126 of three buttons marked with "SEARCH", "NEW DOCUMENT", "EDIT", and a double-sided template image 128 composed of a face image 130 and a reverse image 132. In the illustrated example, the template image 128 schematically represents a 2-page-imposed, double-sided printing format entitled "Custom Template". The format represented by the template image 128 changes in a case where a different template is selected on the pull-down menu 124.

In step S2, the imposition processor 66 decides whether it has received an instruction to save the settings or not. More specifically, the imposition processor 66 decides whether the button group 110, particularly the "SAVE" button, is clicked on or not. If the button group 110 is not clicked on (step S2: NO), then control goes to next step S3.

In step S3, the imposition processor 66 decides whether it has received an instruction for automatic arrangement. The term "automatic arrangement" refers to a process of deciding whether there are page numbers 146 in the plural page data Dp or not, analyzing page numbers 146 in the page data Dp, and determining an order in which the page data Dp are to be arranged.

Figure 5:
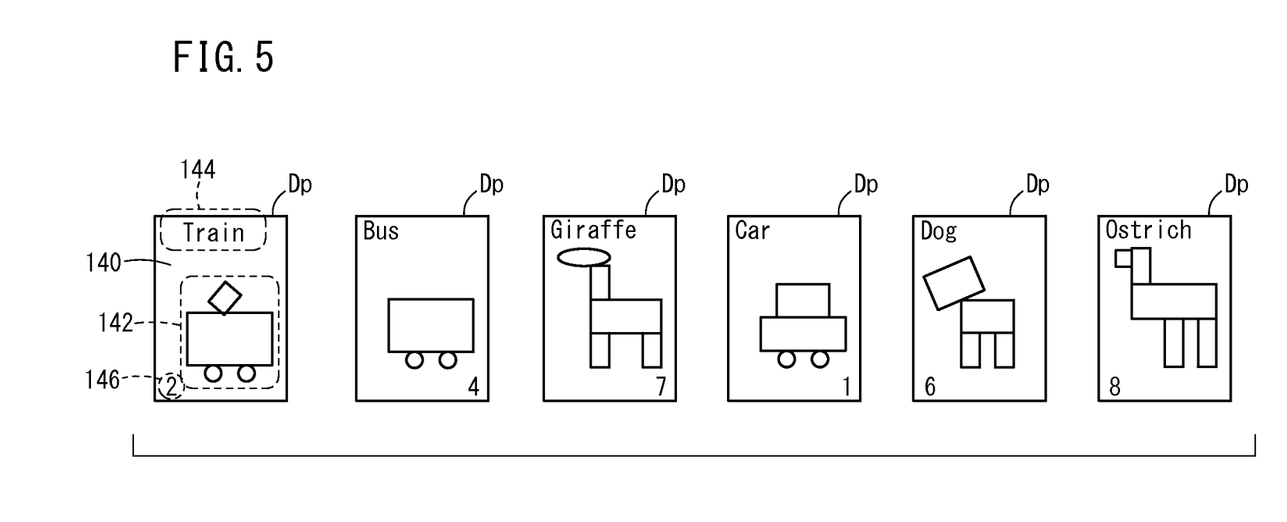
FIG. 5 is a schematic view showing plotted contents of page data.

FIG. 5 schematically shows plotted contents of the page data Dp to be arranged. In the example shown in FIG. 5, the page data Dp include six page data Dp, which have a common page size, representing a train, a bus, a giraffe, a car, a dog, and an ostrich as contents of a pictorial book for children.

The page data Dp on the leftmost end will be described in detail below. The page data Dp represent a page extent 140 containing an illustration 142 that schematically indicates a train in a central portion thereof and a headline 144 indicating "Train" in an upper left portion thereof. Since a page number 146 indicating "2" is positioned in a lower left portion of the page extent 140, the operator can recognize that the page data Dp correspond to the "second page" by seeing the page number 146.

If one designer is in charge of all pages alone, then one file 62 is submitted wherein the contents data of all the pages are arranged in a proper order. If a plurality of designers take charge of parts of all pages, then a plurality of files 62 are submitted at random irrespectively of the order of the pages.

It is assumed that one submitted file 62 contains contents data of one page in the second setting field 104 (FIG. 4). If the contents data are selected in the order of "Train.pdf", "Bus.pdf", "Giraffe.pdf", "Car.pdf", "Dog.pdf", and "Ostrich.pdf", for example, then the page numbers 146 are presented in the order of "2", "4", "7", "1", "6", and "8" (see FIG. 5).

As described above, the submitted files 62 may be acquired irrespectively of the page numbers, or may be allotted file names not related to the page numbers. Therefore, the operator has to open the submitted files 62 one by one and browse and confirm the contents of the page numbers 146 page by page, and will find the process tedious and time-consuming. An "automatic arrangement" function to be described later can be performed to greatly reduce the trouble which would otherwise be caused to the operator, and hence is highly convenient for the operator.

In step S3, specifically, the imposition processor 66 decides whether the "SORT" button 117 (FIG. 4) is clicked on or not. If the "SORT" button 117 is not clicked on (step S3: NO), then control goes back to step S1 and repeats steps S1 through S3 successively. If the "SORT" button 117 is clicked on (step S3: YES), then control goes to next step S4.

In step S4, the page acquirer 72 reads one or two or more submitted files 62 from the memory 60, and acquires a plurality of (six in the example shown in FIG. 5) page data Dp to be arranged. It is assumed here that the page acquirer 72 acquires a plurality of page data Dp from at least two submitted files 62.

In step S5, the operator extractor 74 extracts operators each composed of one or two or more descriptors described in a text format (hereinafter also referred to as "text description operators" or simply "operators") from each of the page data Dp acquired in step S4.

Figure 6A:
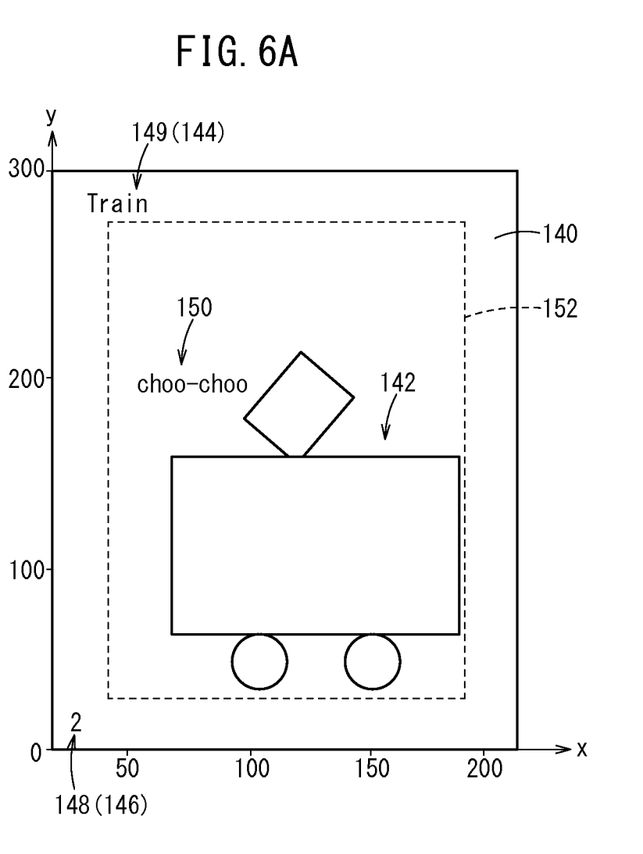
FIG. 6A is a schematic view illustrating a process of extracting text description operators.

FIG. 6A schematically illustrates a process of extracting text description operators. As shown in FIG. 6A, the page extent 140 has a lower left corner defined as an origin O (0, 0), a transverse direction as an x-axis (unit: mm), and a longitudinal direction as a y-axis (unit: mm). The page extent 140, which is of an A4 size, corresponds to a rectangular area having a side (x-axis direction) that is 210 mm long and another side (y-axis direction) that is 297 mm long.

Figure 6B:
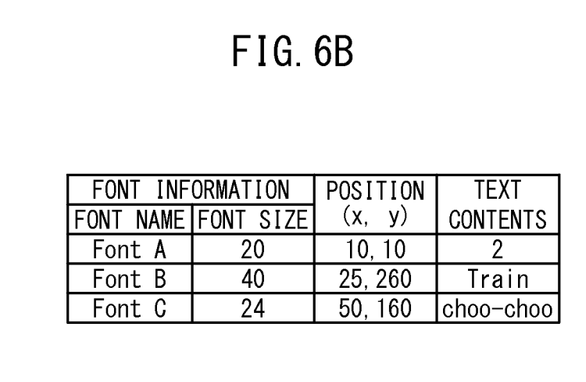
FIG. 6B is a diagram showing extracted text description operators.

As shown in FIG. 6B, three operators are extracted from the page data Dp indicated as "Train.pdf". The variables of each of the operators include font information, positional information (position in an arbitrary coordinate system), and text contents. The "font information" represents information that specifies a font of characters, and includes, for example, a font name, a font size, and decorative information (bold, italic, underline, etc.).

The first operator from the top describes a character string 148 whose font name is "font A", whose font size is "20" (unit: point), whose position is (10, 10) (unit: mm), and whose text contents are "2". The second operator from the top describes a character string 149 whose font name is "font B", whose font size is "40", whose position is (25, 260), and whose text contents are "Train". The third operator from the top describes a character string 150 whose font name is "font C", whose font size is "24", whose position is (50, 160), and whose text contents are "choo-choo".

Similarly, the operator extractor 74 successively extracts operators from all of the remaining page data Dp. The operator extractor 74 temporarily stores the extracted operators in association with the page data Dp.

In step S6, the operator classifier 76 obtains a "particular operator" that satisfy prescribed descriptive conditions by analyzing and classifying the operators extracted in step S5. The prescribed descriptive conditions refer to conditions regarding the positional information, the font information, etc. of the character strings 148 through 150.

For example, it is known that the page numbers 146 are positioned in margins of pages by nature. Prior to classifying operators, therefore, the operator classifier 76 may exclude in advance those operators that cannot represent page numbers 146 in view of the positional features of the page numbers 146.

Referring back to FIG. 6A, a rectangular shape shown in the broken lines within the page extent 140 represents a border frame 152 for deciding whether an operator is to be excluded or not. The border frame 152 surrounds an area whose dimensions correspond to 15 through 85% of one side (x-axis direction) of the page extent 140 and 15 through 85% of another side (y-axis direction) of the page extent 140. The operator classifier 76 excludes the operator whose position (x, y) belongs to the area within the border frame 152, leaving the operators whose positions (x, y) belong to the outside (margins of pages) of the border frame 152. In the illustrated example, the operator classifier 76 excludes only the operator that describes the character string 150 from among the character strings 148 through 150.

Figure 7:
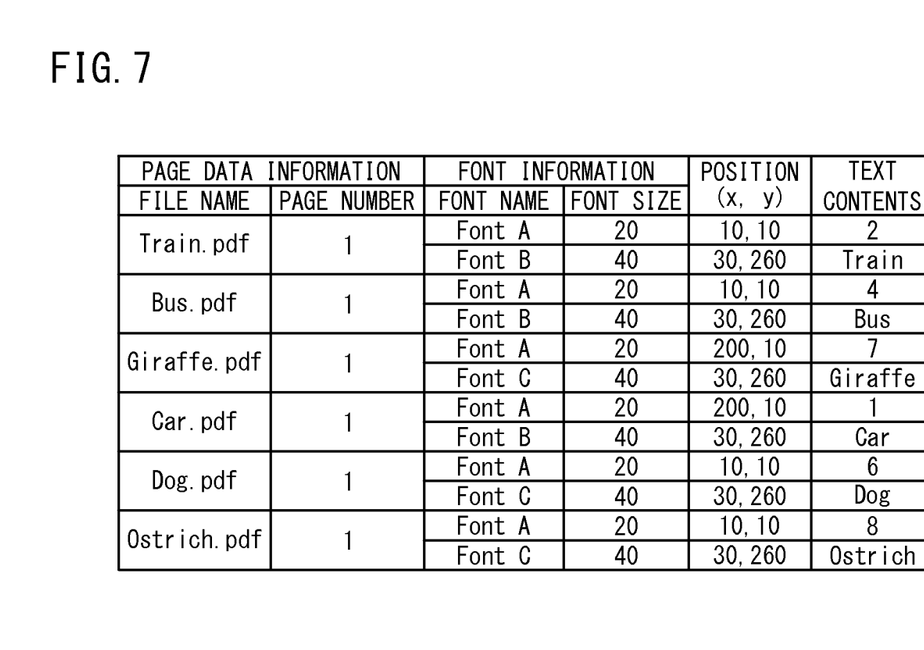
FIG. 7 is a table showing a list of page data information and variables of operators.

As a result, as shown in FIG. 7, twelve text description operators are extracted from the six page data Dp. FIG. 7 shows a list of page data information and variables of operators (see FIG. 6B). The page data information refers to information for identifying the page data Dp, and specifically represents file names and page numbers inherent in data files, for example.

Thereafter, the operator classifier 76 classifies operators that simultaneously satisfy the four assessment conditions described below as "particular operators". Specific examples of the particular conditions will be described below.

[1] According to the first condition, the operator classifier 76 decides whether the text contents contain a character indicating a sequence (hereinafter referred to as "particular character") or not. Since "2" is a particular character, the operator describing the character string 148 satisfies the first condition. On the other hand, since "Train" does not contain a particular character, the operator describing the character string 149 does not satisfy the first condition.

[2] According to the second condition, the operator classifier 76 decides whether there is an overlapping particular character in a plurality of page data Dp or not. In the example shown in FIG. 7, since the text contents are "2", "4", "7", "1", "6", and "8", there are six operators that do not overlap each other.

A particular character is not limited to a single character, but may be made up of a plurality of characters such as "16" or "128". Text contents may be represented by not only Arabic numerals, but also a combination of various characters.

Figure 8:
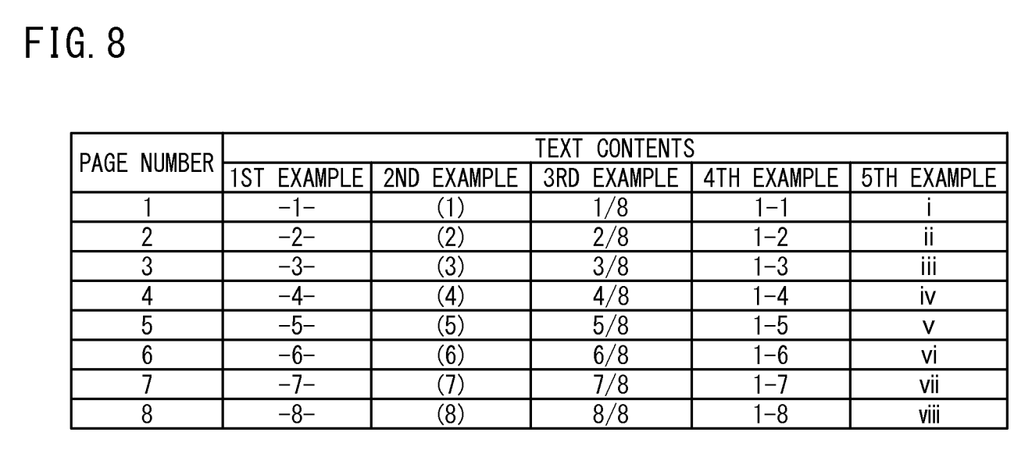
FIG. 8 is a table showing text contents including particular characters.

FIG. 8 shows text contents including particular characters. In a first example shown in FIG. 8, a hyphen "-" is placed before and after a page number, as indicated by "- 1 -" or the like. In a second example, a page number is enclosed by parentheses "("and")", as indicated by "(1)" or the like. In a third example, a page number is followed by "/8" indicating the total number of pages, as indicated by "1/8" or the like. In a fourth example, a page number is preceded by "1 -" indicating a section number, as indicated by "1 - 1" or the like. In a fifth example, a Roman numeral is used instead of an Arabic numeral, as indicated by "i" or the like.

In the third and fourth examples, the text contents include numbers ("8" in the third example and "1" in the fourth example) not indicating page numbers, as well as the page numbers. If these numbers are detected in error as page numbers, then a process of arranging the page data Dp may possibly fail.

For the above reasons, if a character string includes a plurality of particular characters at spaced positions (hereinafter referred to as "particular character candidates"), then the operator classifier 76 calculates the degree of coincidence of characters in a plurality of page data Dp to determine one of the particular character candidates. In the third example, the operator classifier 76 calculates the degree of coincidence of the first character (1 through 8) and the third character (8) of "1/8", and selects the character (first character) whose degree of coincidence is the lowest.

[3] According to the third condition, the operator classifier 76 decides whether there are a plurality of operators whose font names and font sizes coincide with each other in a plurality of page data Dp or not. In the example shown in FIG. 7, there are six operators whose font names are "font A" and whose font sizes are "20", three operators whose font names are "font B" and whose font sizes are "40", and three operators whose font names are "font C" and whose font sizes are "40".

[4] According to the fourth condition, the operator classifier 76 decides whether or not there are a plurality of operators whose positional information coincides with or correspond to each other in a plurality of page data Dp. If the positional information of operators coincides with each other, then it means that the positions of the operators are equal to each other, or the distance between the operators are smaller than an allowable error, e.g., 10 mm. If the positional information of operators corresponds to each other, then it means that the operators satisfy a certain positional relationship with each other, e.g., symmetry with respect to a central axis.

In the example shown in FIG. 7, there are six operators whose positions (30, 260) coincide with each other, four operators whose positions (10, 10) coincide with each other, two operators whose positions (200, 10) coincide with each other, and six operators whose positions (10, 10) and positions (200, 10) correspond to each other. The positions of the operators are symmetrical with respect to the central axis (x=105) of the page extent 140.

If there are operators that satisfy all the first through four conditions, then the operator classifier 76 classifies them as particular operators. In the example shown in FIG. 7, six operators whose text contents are "2", "4", "7", "1", "6", and "8" are obtained as particular operators.

The particular conditions are not limited to those described above, but may be of any types and in any numbers insofar as they can be used to appropriately decide a common format of the page numbers 146. For example, a prescribed percentage (including 100%) at which particular operators are contained in page data Dp to be arranged may be used as a particular condition.

In step S7 shown in FIG. 3, the page order determiner 78 determines an order in which two or more of the page data Dp containing the particular operators classified in step S6 are to be arranged according to the sequence indicated by the particular characters. It is assumed here that the page order determiner 78 arranges the six page data Dp in the ascending order of page numbers.

Figure 9:
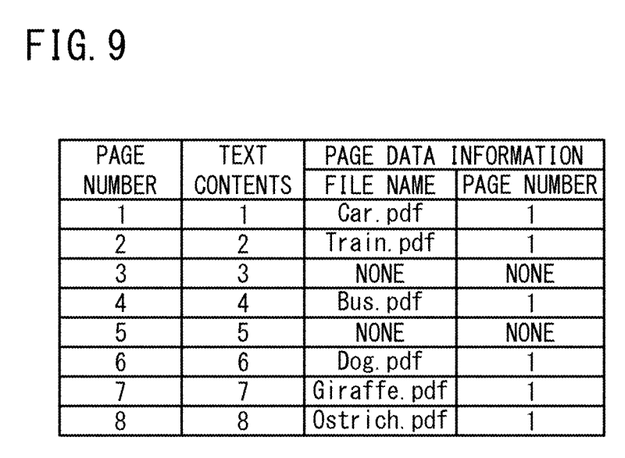
FIG. 9 is a table showing arranged page data.

FIG. 9 shows arranged page data Dp. At "page number 1", the page data Dp corresponding to the "first page" of "Car.pdf", i.e., the fourth page data Dp from the left in FIG. 5, are placed. At "page number 2", the page data Dp corresponding to the "first page" of "Train.pdf", i.e., the first page data Dp from the left in FIG. 5, are placed. At "page number 4", the page data Dp corresponding to the "first page" of "Bus.pdf", i.e., the second page data Dp from the left in FIG. 5, are placed.

At "page number 6", the page data Dp corresponding to the "first page" of "Dog.pdf", i.e., the fifth page data Dp from the left in FIG. 5, are placed. At "page number 7", the page data Dp corresponding to the "first page" of "Giraffe.pdf", i.e., the third page data Dp from the left in FIG. 5, are placed. At "page number 8", the page data Dp corresponding to the "first page" of "Ostrich.pdf", i.e., the sixth page data Dp from the left in FIG. 5, are placed.

At "page number 3" and "page number 5", "Not available" (none) is set because there are no page data Dp whose text contents correspond to "3" and "5". According to the above process, in a case where page data Dp are added and arranged a plurality of times, it is not necessary to update the sequence of the page data Dp which have already been arranged. Therefore, the above process is convenient for adding and arranging page data Dp.

After step S7, control goes back to step S1 wherein the imposing apparatus 20 updates the displayed contents of the editing screen 100. Prior to displaying the editing screen 100, the image generator 84 generates a page arrangement image 118 representing the order determined by the page order determiner 78. Then, the screen generator 82 generates display data for an editing screen 100 including the page arrangement image 118, and supplies the generated display data to the display controller 54. The display controller 54 then controls the display unit 56 to display a window W on the basis of the supplied display data.

Figure 10:
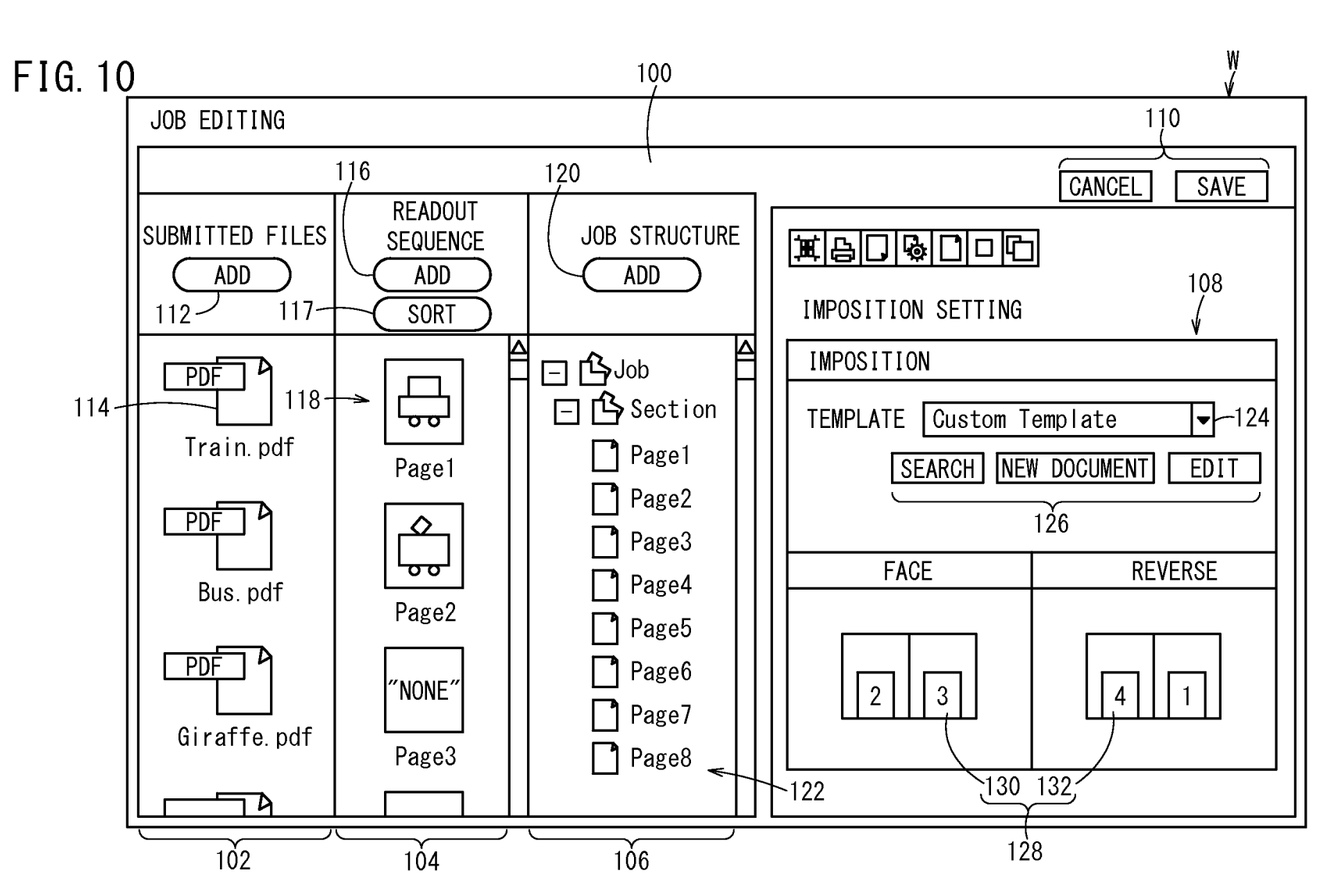
FIG. 10 is a second image diagram showing a job editing screen.

As shown in FIG. 10, the page arrangement image 118 which is different from the page arrangement image 118 shown in FIG. 4 is newly displayed in the second setting field 104 of the editing screen 100. The page arrangement image 118 shown in FIG. 10 includes the thumbnail of "Car" in the first page, the thumbnail of "Train" in the second page, the thumbnail of "NONE" in the third page, and the thumbnail (partial) of "Bus" in the fourth page.

A hierarchical menu 122 which is different from the hierarchical menu 122 shown in FIG. 4 is newly displayed in the third setting field 106 of the editing screen 100. The hierarchical menu 122 shown in FIG. 10 shows eight pages including the original six pages and two blank pages at one hierarchical layer level.

In step S2 shown in FIG. 3, if the imposition processor 66 decides that the button group 110, particularly the "SAVE" button, in FIG. 4 or 10 is clicked on, then control goes to next step S8.

In step S8, the imposition data generator 80 generates imposition data 64 that represent imposition information finalized in steps S1 through S7. Specifically, the imposition data generator 80 generates imposition data 64 including associative information (settings in the second setting field 104) that associates the page numbers 146 and the page data Dp with each other. Alternatively, the imposition data generator 80 may newly generate or add page data Dp representing a table of contents or an index about the associative information, as part of imposition data 64.

Then, the imposition data generator 80 stores and saves the generated imposition data 64 in the memory 60. Thereafter, the imposing apparatus 20 may send out the imposition data 64 through the communication I/F 52 in order for the server 16 to keep the imposition data 64 in storage.

[Advantages of the Present Embodiment]

The imposing apparatus 20 according to the present embodiment includes the page acquirer 72 for acquiring a plurality of page data Dp expressed in a page description language, the operator extractor 74 for extracting operators describing character strings 148 through 150 in a text format, at least one by one, from among the page data Dp, the operator classifier 76 for analyzing the operators and classifying those operators which contain particular characters indicating a sequence in the character strings 148 through 150 and whose font information about the character strings 148 through 150 coincide with each other, as particular operators, and the page order determiner 78 for determining an order in which two or more of the page data Dp containing the particular operators are to be arranged according to the sequence indicated by the particular characters.

Since the imposing apparatus 20 is configured as described above, it is possible to easily and reliably judge a commonality in the typeface of page numbers 146 using the font information itself, thereby increasing the accuracy with which to detect whether there are page numbers 146 or not and the contents of the page numbers 146. Consequently, it is possible to carry out a page arranging process highly successfully even if the number of types of fonts that can be used for page numbers 146 is huge.

The present invention is not limited to the embodiment described above, but various changes and modifications may be made therein without departing from the scope of the invention.

For example, the types of particular characters are not limited to Arabic numerals and Roman numerals described above, but may be any characters conjuring up a sequence, such as Chinese numerals, Indian numerals, alphabet, etc.

What is claimed is:

1. A data processing apparatus comprising:
a page acquirer for acquiring a plurality of page data expressed in a page description language;
an operator extractor for extracting operators describing character strings in a text format, at least one by one, from among the page data acquired by the page acquirer;
an operator classifier for analyzing the operators extracted by the operator extractor and classifying those operators which contain particular characters indicating a sequence in the character strings and whose font information about the character strings coincide with each other, as particular operators; and
a page order determiner for determining an order in which two or more of the page data containing the particular operators classified by the operator classifier are to be arranged according to the sequence indicated by the particular characters.

2. The data processing apparatus according to claim 1, wherein the operator classifier further classifies those operators describing the character strings whose positional information coincides with or corresponds to each other.

3. The data processing apparatus according to claim 2, wherein the operator classifier further classifies those operators describing the character strings whose positions identified by the positional information belong to margins of pages represented by the page data.

4. The data processing apparatus according to claim 1, wherein the operator classifier classifies those operators whose font names and font sizes identified by the font information coincide with each other.

5. The data processing apparatus according to claim 1, further comprising an image generator for generating a page arrangement image representing the order determined by the page order determiner.

6. The data processing apparatus according to claim 1, wherein the page acquirer acquires the plurality of page data from at least two data files.

7. The data processing apparatus of claim 1, wherein the page order determiner receives the particular operators, and the particular characters of the particular operators are numerical characters, and the page order determiner orders the page data based on sequence of the numerical characters.

8. The data processing apparatus of claim 1, wherein the particular operators are identified by at least one of font type, font size, position and type of content, wherein the at least one of font type and font size are same across two or more of the page data.

9. The data processing apparatus of claim 8, wherein the particular operators are identified by font type and position and comprise number content, and wherein the page order determiner receives the particular operators, and the page order determiner orders the page data based on sequence of the number content associated with respective page data.

10. A data processing method for enabling a computer to execute the steps of:
acquiring a plurality of page data expressed in a page description language;
extracting operators describing character strings in a text format, at least one by one, from among the acquired page data;
analyzing the extracted operators and classifying those operators which contain particular characters indicating a sequence in the character strings and whose font information about the character strings coincide with each other, as particular operators; and determining an order in which two or more of the page data containing the classified particular operators are to be arranged according to the sequence indicated by the particular characters.

11. A nontransitory storage medium storing therein a data processing program for enabling a computer to execute the steps of:
acquiring a plurality of page data expressed in a page description language;
extracting operators describing character strings in a text format, at least one by one, from among the acquired page data;
analyzing the extracted operators and classifying those operators which contain particular characters indicating a sequence in the character strings and whose font information about the character strings coincide with each other, as particular operators; and
determining an order in which two or more of the page data containing the classified particular operators are to be arranged according to the sequence indicated by the particular characters.

\* \* \* \* \*